UNITED STATES PATENT OFFICE.

JULIUS DE LONG, OF ALLEGHENY, PENNSYLVANIA.

OIL-CONDUCTOR FOR CAR-AXLE BOXES.

SPECIFICATION forming part of Reissued Letters Patent No. 10,233, dated November 7, 1882.

Original No. 263,490, dated August 29, 1882. Application for reissue filed October 5, 1882.

*To all whom it may concern:*

Be it known that I, JULIUS DE LONG, of Allegheny, in the county of Allegheny and State of Pennsylvania, have invented certain new and useful Improvements in Oil-Conductors for Car-Axle Boxes; and I do hereby declare that the following is a full, clear, and exact description of the invention, that will enable others skilled in the art to which it appertains to make and use the same.

The object of this invention is to promote efficiency and durability in oil-conductors for car-axle boxes.

The invention consists in animal-hair adapted as a substitute for the cotton waste generally used for oil-conductors.

It further consists in animal-hair picked and carded to produce a fine and clean medium to retain and conduct the oil to the journal, all as hereinafter fully described and claimed.

Animal-hair may be produced either as a waste material in the process of preparing hides in a tannery, or it may be produced in other ways. In the former case it may contain lime and other bodies, which, if present to an injurious proportion, ought to be washed out. In the latter case the washing may be omitted. Whether such washing is or is not required will be determined by the quality of the hair. In some cases the presence of more or less lime or other substances will be found to be immaterial to the successful use of the hair as an oil-conductor. Where the conductor is desired to be of a perfectly clean and fine quality I prefer to thoroughly wash the hair if it contains injurious matter. Then the hair is thoroughly dried, after which it is ready for use or market. For still finer grades, I propose, after drying, to pass it through a suitable picker, and then through a carding-machine, so as to remove the tendency to pack or mat when applied to use.

For convenience in packing the hair for market and in removing it from the packages for use, it may be moistened with oil to remove its fluffiness or tendency to fly about, so that it can be conveniently handled.

The hair is used in the same manner as cotton waste for bringing the oil in the axle-box into contact with the axle-journal, and thus to keep the journal lubricated.

The hair is an excellent oil-conductor, keeping the journals lubricated as long as there is any oil in the axle-box, and is also very durable, wearing much longer than the materials ordinarily used for this purpose, and not being so liable to burn or char from the heat. It may be used with oil or any of the usual lubricating substances or mixtures.

Having thus described my invention, I claim and desire to secure by Letters Patent—

1. An oil-conductor for car-axle journal-boxes and similar devices, consisting of animal-hair, substantially as herein shown and described.

2. An oil-conductor for car-axle journal-boxes and similar devices, consisting of animal-hair free from foreign substances and carded, substantially as described.

3. As a new article of manufacture, animal-hair freed from foreign substances and moistened with oil, substantially as described.

4. As a new article of manufacture, animal-hair freed from foreign substances, picked, carded, and oiled, to adapt it for use as an oil-conductor for car-axle boxes, substantially as herein shown and described.

In testimony that I claim the foregoing I have hereunto set my hand this 25th day of September, 1882.

JULIUS DE LONG.

Witnesses:

T. J. MCTIGHE,

JOS. B. CONNOLLY.